United States Patent
Lao et al.

(10) Patent No.: US 7,085,741 B2
(45) Date of Patent: Aug. 1, 2006

(54) METHOD AND APPARATUS FOR MANAGING DIGITAL CONTENT USAGE RIGHTS

(75) Inventors: Guillermo Lao, Torrance, CA (US); Rory Jacobs, Cypress, CA (US); Mai Nguyen, Buena Park, CA (US); Manuel Ham, Downey, CA (US); Vincent Tieu, Torrance, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 750 days.

(21) Appl. No.: 10/046,695

(22) Filed: Jan. 17, 2002

(65) Prior Publication Data

US 2002/0109707 A1    Aug. 15, 2002

Related U.S. Application Data

(60) Provisional application No. 60/261,753, filed on Jan. 17, 2001.

(51) Int. Cl.
*G06F 17/60* (2006.01)

(52) U.S. Cl. ............ 705/51; 705/52; 705/53; 705/54; 705/55; 705/56; 705/57; 705/58; 705/59; 705/50; 380/201; 707/9; 707/104.1; 713/182; 713/183; 713/184; 713/185; 713/186

(58) Field of Classification Search ............ 705/50–59; 380/201; 707/9, 104.1; 713/182–186
See application file for complete search history.

(56) References Cited

U.S. PATENT DOCUMENTS

| | | | |
|---|---|---|---|
| 3,263,158 A | 7/1966 | Janis | |
| 3,609,697 A | 9/1971 | Blevins et al. | |
| 3,790,700 A | 2/1974 | Callais et al. | |
| 3,798,605 A | 3/1974 | Feistel | |
| 4,159,468 A | 6/1979 | Barnes et al. | |
| 4,220,991 A | 9/1980 | Hamano et al. | |
| 4,278,837 A | 7/1981 | Best | |
| 4,323,921 A | 4/1982 | Guillou | |
| 4,442,486 A | 4/1984 | Mayer | |
| 4,529,870 A | 7/1985 | Chaum | |
| 4,558,176 A | 12/1985 | Arnold et al. | |
| 4,593,376 A | 6/1986 | Volk | |

(Continued)

FOREIGN PATENT DOCUMENTS

EP    0 084 441    7/1983

(Continued)

OTHER PUBLICATIONS

Weber, Robert. Digital Rights Management Technologies. Oct. 1995. Retrieved from IDS.*

(Continued)

*Primary Examiner*—James A Reagan
(74) *Attorney, Agent, or Firm*—Marc S. Kaufman; Carlos R. Villamar; Nixon Peabody, LLP

(57) ABSTRACT

A method and an apparatus for specifying and editing rights associated with a content includes a general model that comprehends rights specification at different levels of the content life cycle. The rights specification includes content association, and the protection of the content is a byproduct of the content and rights association. The general model includes a rights component, a conditions component, a rights offer component, and a rights label component. The rights offers specify the relationship between rights and conditions. The rights labels are collections of the offers.

21 Claims, 9 Drawing Sheets

U.S. PATENT DOCUMENTS

| | | |
|---|---|---|
| 4,614,861 A | 9/1986 | Pavlov et al. |
| 4,644,493 A | 2/1987 | Chandra et al. |
| 4,658,093 A | 4/1987 | Hellman |
| 4,713,753 A | 12/1987 | Boebert et al. |
| 4,796,220 A | 1/1989 | Wolfe |
| 4,817,140 A | 3/1989 | Chandra et al. |
| 4,827,508 A | 5/1989 | Shear |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A * | 8/1992 | Corbin ............ 713/200 |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,295,266 A * | 3/1994 | Hinsley et al. ............ 718/101 |
| 5,301,231 A | 4/1994 | Abraham et al. |
| 5,311,591 A | 5/1994 | Fischer |
| 5,319,705 A | 6/1994 | Halter et al. |
| 5,335,346 A * | 8/1994 | Fabbio ............ 711/163 |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,394,469 A | 2/1995 | Nagel et al. |
| 5,410,598 A | 4/1995 | Shear |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,748,783 A | 5/1998 | Rhoads |
| 5,757,907 A | 5/1998 | Cooper et al. |
| 5,761,686 A | 6/1998 | Bloomberg |
| 5,765,152 A | 6/1998 | Erickson |
| 5,768,426 A | 6/1998 | Rhoads |
| 5,798,757 A | 8/1998 | Smith |
| 5,825,892 A | 10/1998 | Braudaway et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,047,067 A | 4/2000 | Rosen |
| 6,112,181 A | 8/2000 | Shear et al. |
| 6,115,471 A | 9/2000 | Oki et al. |
| 6,138,119 A | 10/2000 | Hall et al. |
| 6,157,721 A | 12/2000 | Shear et al. |
| 6,185,683 B1 | 2/2001 | Ginter et al. |
| 6,226,618 B1 | 5/2001 | Downs et al. |
| 6,233,684 B1 | 5/2001 | Stefik et al. |
| 6,236,971 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,301,660 B1 | 10/2001 | Benson |
| 6,327,652 B1 | 12/2001 | England et al. |
| 6,330,670 B1 | 12/2001 | England et al. |
| 6,345,256 B1 | 2/2002 | Milsted et al. |
| 6,363,488 B1 | 3/2002 | Ginter et al. |
| 6,389,402 B1 | 5/2002 | Ginter et al. |
| 6,714,921 B1 * | 3/2004 | Stefik et al. .................. 705/55 |

FOREIGN PATENT DOCUMENTS

| | | |
|---|---|---|
| EP | 0 180 460 | 5/1986 |
| EP | 0 332 707 | 9/1989 |
| EP | 0 651 554 | 5/1995 |
| EP | 0 668 695 | 8/1995 |
| EP | 0 715 244 A1 | 6/1996 |
| EP | 0 725 376 | 8/1996 |
| GB | 2 136 175 | 9/1984 |
| GB | 2 236 604 | 4/1991 |
| GB | 2316503 A | 2/1998 |
| JP | 62-241061 | 10/1987 |
| JP | 64-068835 | 3/1989 |

| | | | |
|---|---|---|---|
| JP | H03-282733 | * | 3/1990 |
| JP | 04-369068 | | 12/1992 |
| JP | 05-268415 | | 10/1993 |
| JP | 06-175794 | | 6/1994 |
| JP | 06-215010 | | 8/1994 |
| JP | 07-084852 | | 3/1995 |
| JP | 07-200317 | | 8/1995 |
| JP | 07-244639 | | 9/1995 |
| JP | 0 715 241 | | 6/1996 |
| WO | WO 92/20022 | | 11/1992 |
| WO | WO 93/01550 | | 1/1993 |
| WO | WO 94/01821 | | 1/1994 |
| WO | WO 96/24092 | | 8/1996 |
| WO | WO 97/48203 | | 12/1997 |
| WO | WO 98/11690 | | 3/1998 |
| WO | WO 98/42098 | | 9/1998 |
| WO | WO 99/49615 | | 9/1999 |
| WO | WO 00/04727 | | 1/2000 |
| WO | WO 00/08909 | | 2/2000 |
| WO | WO 00/39733 | | 7/2000 |
| WO | WO 01/63528 | | 8/2001 |

OTHER PUBLICATIONS

Contentguard; "The Need for a Rights Language—Technical White Paper—Version 1.0"; Contentguard White Paper; 'Online!; Nov. 9, 2001; XP-002333474; pp. 1-12.

Contentguard; "XrML: Extensible Rights Markup Language—Version 1.2"; Contentguard XRML 1.2; 'Online!; Oct. 30, 2001; XP-002333475; pp. 1-134; http://www.xrml.org.

Renato Iannella; "Open Digital Rights Language (ODRL) Version: 09"; Online!; Jun. 29, 2001; XP-002333742; pp. 1-44.

David C. Fallside: "XML Schema Part O:; Primer"; W3C Recommendation; May 2, 2001; 'Online!; XP-002333743.

European Search Report for EP 02 80 3667; dated Aug. 31, 2005.

European Search Report dated Jul. 20, 2004 in EP 02 70 1056.

European Search Report dated Jun. 22, 2003 (European Patent Application No. 02741783.1).

Henry H. Perritt, Jr., "Technological Strategies for Protecting Intellectual Property in the Networked Multmedia Enviroment", Apr. 2-3, 1993, Knowbots, Permissions Headers & Contract Law.

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119-131, 1986, Comput. & Graphics, vol. 10, No. 2.

Mori, R. et al., "Superdistribution: The Concept and the Architecture", pp. 1133-1146, 1990, The Transactions of.

Weber, R., "Metering Technologies for Digital Intellectual Property", pp. 1-29, Oct. 1994, A Report to the International Federation of Reproduction Rights Organizations.

Clark, P.C. et al., "Bits: A Smartcard protected Operating System", pp. 66-70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.

O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9-20, Jan. 1994, IMA Intellectual Property Project Proceedings, vol. 1, Issue 1.

Perrit, Jr., H., "Permission Headers and Contract Law", pp. 27-48, Jan. 1994, IMA Intellectual Property Project Proceedings, vol. 1, Issue 1.

Upthegrove, L., "Intellectual Property Header Descriptors: A Dynamic Approach", pp. 63-66, Jan. 1994, IMA Intellectual Property Proceedings, vol. 1, Issue 1.

Sirbu, M., "Internet Billing Service Design and prototype Implementation", pp. 67-80, Jan. 1994, IMA Intellectual Property Project Proceedings, vol. 1, Issue 1.

Simmel, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths and Metaphors.

McHugh, J. et al., Computers & Security 07 (1988) 387-396.

PCT International Search Report, Date of Mailing Apr. 11, 2002, 6 pages.

* cited by examiner

| Simple edit | Advanced edit |

Title    BobPub_10095_31958_857
URL      ftp://127.0.0.1/BobPub_10095_31958_857.etxt

Rights Groups

| Name | View | Extract | Play | Print | Export | Fee USD United States Dollars |
|---|---|---|---|---|---|---|
| $i | ☑ | ☐ | ☐ | ☑ | ☐ | 1.00 |
| print right | ☐ | ☐ | ☐ | ☑ | ☐ | 2.00 |
|  | ☐ | ☐ | ☐ | ☐ | ☐ |  |
|  | ☐ | ☐ | ☐ | ☐ | ☐ |  |

Add more rows

Metadata

| Field Name | Field Value |
|---|---|
| | |
| | |

Add more rows

Submit

Fig. 8

Advanced Edit Label

[Simple edit] [Advanced edit]   800

IMPORTANT: Only use this feature if you are very familiar with XrML syntax. Mistakes in editing can render the rights label unusable.

```
<?xml version="1.0"?>

<!DOCTYPE XrML SYSTEM 'file://localhost/C:/CGBO1.3/XrML/xrmlCG13.dtd'>

<XrML version="1.1">
  <BODY type="Document" version="1.1">
    <ISSUED> </ISSUED>
    <TIME>
      <FROM>2000-01-01T00:00:00</FROM>
      <UNTIL>3000-12-31T23:59:59</UNTIL>
    </TIME>
    <DESCRIPTOR>
      <OBJECT>
            <ID type="">00092fa2-9a66-11d4-b19d-00e0296ac832</ID>
            <NAME />
      </OBJECT>
    </DESCRIPTOR>
    <ISSUER>
      <OBJECT type="Publisher">
            <ID type="loginname">BobPublishing</ID>
            <NAME />
      </OBJECT>
      <ENABLINGBITS type="TWOFISH">
            <VALUE encoding="base64">pwAAAFNFQ0VOVgACAAA0AAAAFAAAAAAAA
      </ENABLINGBITS>
      <PUBLICKEY>
            <ALGORITHM>SHA1</ALGORITHM>
            <PARAMETER name="ContentGuard Proprietary Public Key">
              <VALUE encoding="base64">+wEAABYAAAADAAAARFNBAwAAAFJBV+UB/
```

[Submit] [Reset]

Fig. 9

Label Management

You may search for labels by title and/or last modified date. * may be used as wildcard while entering the title. The date format is YYYY-MM-DD.

Title [            ]          Since [2000-10-05]   Search

Please select one or more labels from the list below. Then, click Edit to make changes, or click Delete to delete the selected rights label(s).

You can select more than one label to edit. In this case, the same settings are applied to all selected labels.

```
2000-10-05 : BobPub_10095_31958_857
2000-10-05 : BobPub_10095_4532_934
2000-10-06 : BobPub_10096_172328_757
2000-10-05 : BobPub_10095_3278_863
2000-10-06 : BobPub_10096_74339_458
2000-10-06 : BobPub_10096_163322_732
2000-10-05 : BobPub_10095_25121_833
2000-10-05 : BobPub_10095_11414_1251
2000-10-06 : BobPub_10096_32557_317
2000-10-05 : BobPub_10095_202337_68
2000-10-05 : BobPub_10095_33419_869
2000-10-06 : BobPub_10096_2714_272
2000-10-06 : BobPub_10096_14461_678
2000-10-07 : BobPub_10097_31738_1044
2000-10-05 : BobPub_10095_8620_1089
2000-10-05 : BobPub_10095_0644_691
2000-10-06 : BobPub_10096_93813_519
2000-10-05 : BobPub_10095_105059_1214
2000-10-05 : BobPub_10095_214224_116
2000-10-06 : BobPub_10096_12301_609
2000-10-06 : BobPub_10096_113955_583
2000-10-05 : BobPub_10095_24414_827
2000-10-05 : BobPub_10095_18740_2
```

Edit

Delete

Select All

METHOD AND APPARATUS FOR MANAGING DIGITAL CONTENT USAGE RIGHTS

RELATED APPLICATION DATA

This application claims benefit of U.S. provisional application Ser. No. 60/261,753 filed on Jan. 17, 2001, the disclosure of which is incorporated herein by reference.

BACKGROUND OF THE INVENTION

The invention relates to usage rights for controlling the distribution and use of digital content, and more particularly to a method and an apparatus for managing usage rights to be associated with content.

The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software tools (known as "browsers") which allow both HTML (hypertext markup language) viewing and HTTP (hypertext transfer protocol) navigation. Browsers allow a simple GUI (graphical user interface) to be used to communicate over the Internet. Browsers generally reside on the computer used to access content on the Internet, i.e. the client computer. HTTP is a component on top of TCP/IP and provides users access to documents of various formats using the standard page description language known as HTML and more recently XML (extensible markup language) and XHTML (extensible hypertext markup language), a reformulation of HTML into XML. The collection of servers on the Internet using HTML/HTTP has become known as the "World Wide Web" or simply the "Web."

Through HTML, XHTML, and interactive programming protocols, the author of content is able to make the content available to others by placing the content, in the form of a Web page, on an Internet Web server. The network path to the server is identified by a URL (Uniform Resource Locator) and, generally, any client running a Web browser can access the Web server by using the URL. A client computer running a browser can request a display of a Web page stored on a Web server by issuing a URL request through the Internet to the Web in a known manner.

Since the Web utilizes standard protocols and a standard rendering engine, i.e. the rendering engine of the browser, the Web has become ubiquitous. One of the primary applications of the Web has been distribution of content in the form of documents. A "document", as the term is used herein, is any unit of information subject to distribution or transfer, including but not limited to correspondence, books, magazines, journals, newspapers, other papers, software, photographs and other images, audio and video clips, and other multimedia presentations. A document may be embodied in printed form on paper, as digital data on a storage medium, or in any other known manner on a variety of media.

However, one of the most important issues impeding the widespread distribution of digital documents, i.e. documents in forms readable by computers, via electronic means, and the Internet in particular, is the current lack of protection of the intellectual property rights of content owners during the distribution and use of those digital documents. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital rights management (DRM)" herein.

In the world of printed documents, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital documents. Accordingly, some method of protecting digital documents is necessary to make it more difficult to copy and distribute them without authorization.

Unfortunately, it has been widely recognized that it is difficult to prevent, or even deter people from making unauthorized distributions of electronic documents within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of "broadband" communications technologies will render it even more convenient to distribute large documents electronically, including video files such as full length motion pictures, and thus will remove any remaining deterrents to unauthorized distribution of documents. Accordingly, DRM technologies are becoming very useful.

Two basic schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as Cryptolopes by IBM™ and by InterTrust's ™ Digiboxes fall into this category. Clearly, the secure container approach provides a solution to protecting the document during delivery over insecure channels, but does not provide any mechanism to prevent legitimate users from obtaining the clear document and then using and redistributing it in violation of content owners's intellectual property.

Cryptographic mechanisms are typically used to encrypt (or "encipher") documents that are then distributed and stored publicly, and ultimately privately deciphered, i.e. unencrypted, by authorized users. This provides a basic form of protection during document delivery from a document distributor to an authorized user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is still a real challenge to existing technologies, current market trends suggest that open and untrusted systems such as PC's and workstations using browsers to access the Web, will be the dominant systems used to access copyrighted documents. In this sense, existing computing environments such as PC's and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. No. 5,715,403, the disclosure of which is incorporated herein by reference, discloses a system for controlling the distribution of digital documents. Each rendering device has a repository associated therewith. Usage rights labels are associated with digital content. The labels include usage rights that specify a manner of use of the content and any conditions precedent for exercising the manner of use. U.S. Pat. No. 5,052,040 discloses the use of a label prefixed to digital files so that different users can have specific encryption capability and rights with respect to the same file.

The proliferation of the Web, and its usefulness in document distribution, makes it desirable to apply DRM features to many documents in various systems. However, there are no universally accepted formats or mechanisms for creating usage rights, associating usage rights with content, or generally managing usage rights. Accordingly, applications form various vendors are not compatible with usage rights associated with various documents in a consistent manner.

SUMMARY OF THE INVENTION

The embodiment described below provides an easy to use application or GUI so any authorized user can create and mange usage rights. This is accomplished by providing an object oriented model that comprehends rights specification at different levels of the document life cycle (creation, distribution, retail, etc), and provides powerful capabilities (such as batch support and rights delegation).

A first aspect of the invention is a system for manipulating and managing usage rights adapted to be associated with digital content. The system comprises a rights module operative to specify a manner of use, a conditions module operative to specify one or more conditions necessary for exercising a manner of use, and an offers module operative to combine one or more rights specified by said rights module and one or more conditions specified by the conditions module to create a rights offer object of usage rights and associated conditions necessary for exercising a manner of use indicated by the usage rights.

A second aspect of the invention is a label for expressing usage rights adapted to be associated with digital content. The label comprises usage rights specifying a manner of use, conditions specifying one or more conditions necessary for exercising a manner of use, wherein one or more of said usage rights and one or more of said conditions are combined to create a rights offer object, and a label container including at least one rights offer object.

BRIEF DESCRIPTION OF THE DRAWING

The invention is described through preferred embodiments and the attached drawing in which:

FIG. 7 is an example of a simple edit screen of the preferred embodiment;

FIG. 8 is an example of an advanced edit screen of the preferred embodiment; and FIG. 9 is an example of a label management screen of the preferred embodiment.

DETAILED DESCRIPTION OF THE PREFERRED EMBODIMENT

Figure 1:
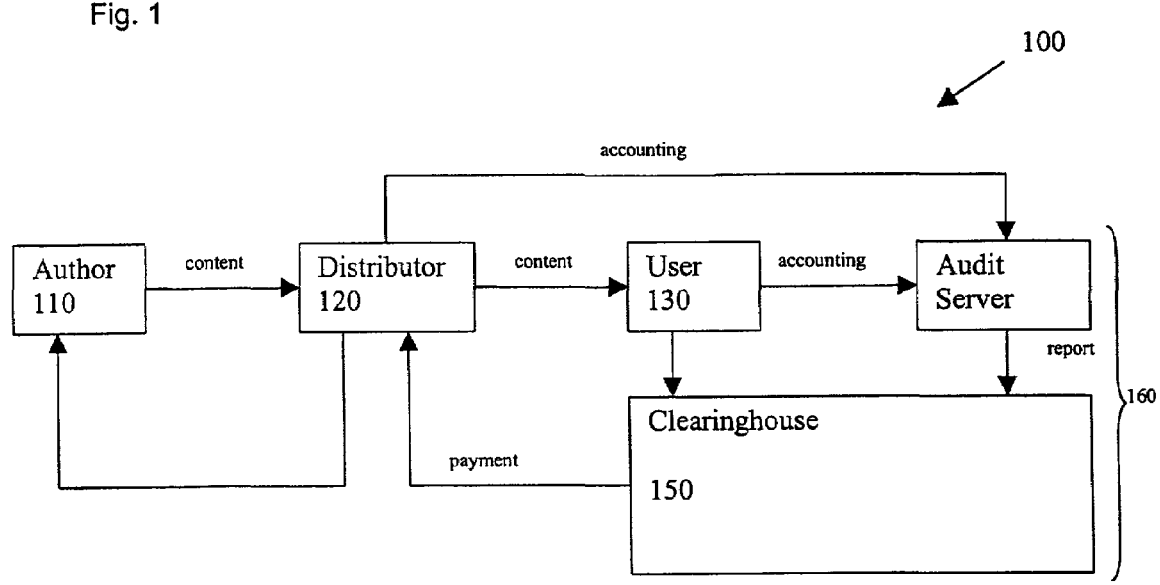
FIG. 1 is a block diagram of a content distribution system that can be used with the preferred embodiment.

FIG. 1 is a block diagram of a system for the electronic distribution that can be used with the preferred embodiment. Author 110 creates original content and passes it to distributor 120 for distribution. Ordinarily, author 110 is the creator of the content. However, the term "author" as used herein can be the creator, owner, editor, or other entity controlling the content or an agent (e.g. a publisher) of one of those entities. Also author 110 may distribute documents directly, without involving another party such as distributor 120, and thus the author and distributor may be the same entity. However, the division of functions set forth in FIG. 1 is efficient, as it allows author 110 to concentrate on content creation and not the administrative functions of distribution. Moreover, such a breakdown facilitates economies of scale by permitting distributor 120 to associate with a number of authors 110. The term "document", as used herein, generally refers to any type of document, such as text, audio, or other data, including any encryption, formatting, or the like. The term "content", as used herein, generally refers to a document or any other object that can have usage rights associated therewith. For example the content can be a document service, such as a Web service defined by Web Service Description Language (WSDL) and published in a Uniform Description, Discovery, and Integration (UDDI) directory.

Distributor 120 associates a rights label, which is described in detail below, with the content. The rights label can be registered with clearinghouse 150 and stored in a label repository, such as a memory device associated with clearinghouse 150. The content can be stored in a content repository, such as a storage device associated with distributor 120. Alternatively, the label and content can be stored on the same device. Distributor 120 distributes content to user 130, through a digital storefront on the Web or the like, upon request. In a typical electronic distribution model, the content is distributed in encrypted form. Distributor 120 encrypts the content with a random key and then encrypts the random key with a public key corresponding to user 130. Thus the encrypted document is customized solely for the particular user 130. User 130 is then able to use their private key to unencrypt the random key and use it to unencrypt and view the document. For example, PKI technology is used with the preferred embodiment. However, any other type of ciphering, encryption, watermarking, or other security or obfuscation methods can be used.

The private key, or other identification information is issued to user 130 upon purchase of an appropriate rights label (described in detail below) from clearinghouse 150. In particular, payment for the document is passed from user 130 to distributor 120 by way of clearinghouse 150 which collects requests from user 130 and from other users who wish to use particular content. Clearinghouse 150 also collects payment information, such as debit transactions, credit card transactions, or other known electronic payment schemes, and forwards the collected payments as a payment batch to distributor 120. Of course, clearinghouse 150 may retain a share of the payment as a fee for the above-noted services. Distributor 120 may retain a portion of the batch payment from clearinghouse 150 for distribution services and forward a payment (for example royalties) to author 110.

User 130 requests a rights label corresponding to desired content from clearinghouse 150 and provides clearinghouse 150 with information, such as credit card and charge authorization information, personal information, or the like to permit clearinghouse 150 to authorize user 130 in a known manner. Once user 130 has been authorized and obtained the rights label from clearinghouse 150, user 130 may request the associated content from distributor 120 by submitting the rights label, including authorization identification, such as a private key, obtained from clearinghouse 150. Distributor 120 parses the rights label to determine which content is associated therewith and permits the content to be decrypted and used in accordance with the usage rights in the rights label in a known manner. If the rights label is not presented, or the conditions thereof are not satisfied, the content is not made available for use.

Each time user 130 requests a rights label corresponding to a document, an accounting message is sent to audit server 140 which ensures that each label request by user 130 matches with a subsequent document sent by distributor 120 to user 130. Accounting information is received by audit server 140 directly from distributor 120. Any inconsistencies are transmitted via a report to clearinghouse 150, which can then adjust the payment batches made to distributor 120 accordingly. This accounting scheme is present to reduce the possibility of fraud in electronic document distribution and to handle any time-dependent usage permissions that may result in charges that vary, depending on the duration or other extent of use. Audit server 140 and clearinghouse 150, in combination, can serve as transaction aggregator 160 which functions to aggregate plural transactions over a period of time, and charge distributor 120 in an appropriate manner to reduce the accounting overhead of distributor 120. The model for electronic document distribution illustrated in FIG. 1 can be applied to distribution of documents using rights labels of the preferred embodiment disclosed herein.

The preferred embodiment incorporates a model for usage rights specifications or "rights specifications." Software applications and user interfaces can be created to conform to the model to facilitate the workflow in creating a rights specification. As an example, the underlying mechanism can use a grammar, such as that disclosed in U.S. Pat. No. 5,715,403, U.S. provisional application Ser. No. 60/261,753, the disclosure of which are incorporated herein by reference. The invention can be applied to any language or grammar for rights specifications. The term "rights specification" as used herein refers generally to the association of usage rights with content.

The model includes four components, a rights component, a conditions component, an offer component, and a label component. Each component can be created by a corresponding software module. Of course, the modules need not be separate physical entities, or even separate lines of code, but are merely used as in the preferred embodiment a way of describing the functional aspect of the software used to create usage rights labels in accordance with the preferred embodiment. Each component is discussed in detailed below.

Usage rights or "rights", specify manners of use. For example, a manner of use can include the ability to view, print, copy distribute or the like as set forth in U.S. Pat. No. 5,715,403 the disclosure of which is incorporated herein by reference. Rights can also be bundled as in "view and print." More sophisticated usage rights can be, for example, the right to sell if the principal is an intermediary such as a wholesaler.

Conditions must be satisfied in order to exercise the manner of use in a specified usage right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Rights and conditions can exist as separate entities, but by themselves are not very useful. For example, a right, such as right to view content, can be specified, but without any association to conditions it is not very useful.

Rights offers, or "offers" include a rights component and a conditions component and a relationship therebetween. Accordingly, an offer can present a choice that a consumer, i.e. user of content, can make. For example, and offer can be to view and print unlimited number of copies (usage rights) for a payment of $5.00 (condition). An offer can be created by selecting rights and the conditions that are associated with each right or bundle of rights. In more sophisticated examples, a rights offer could be, for example, an offer to allow the sale of 500 copies at a specified fee if the user is a wholesaler.

Figure 2:
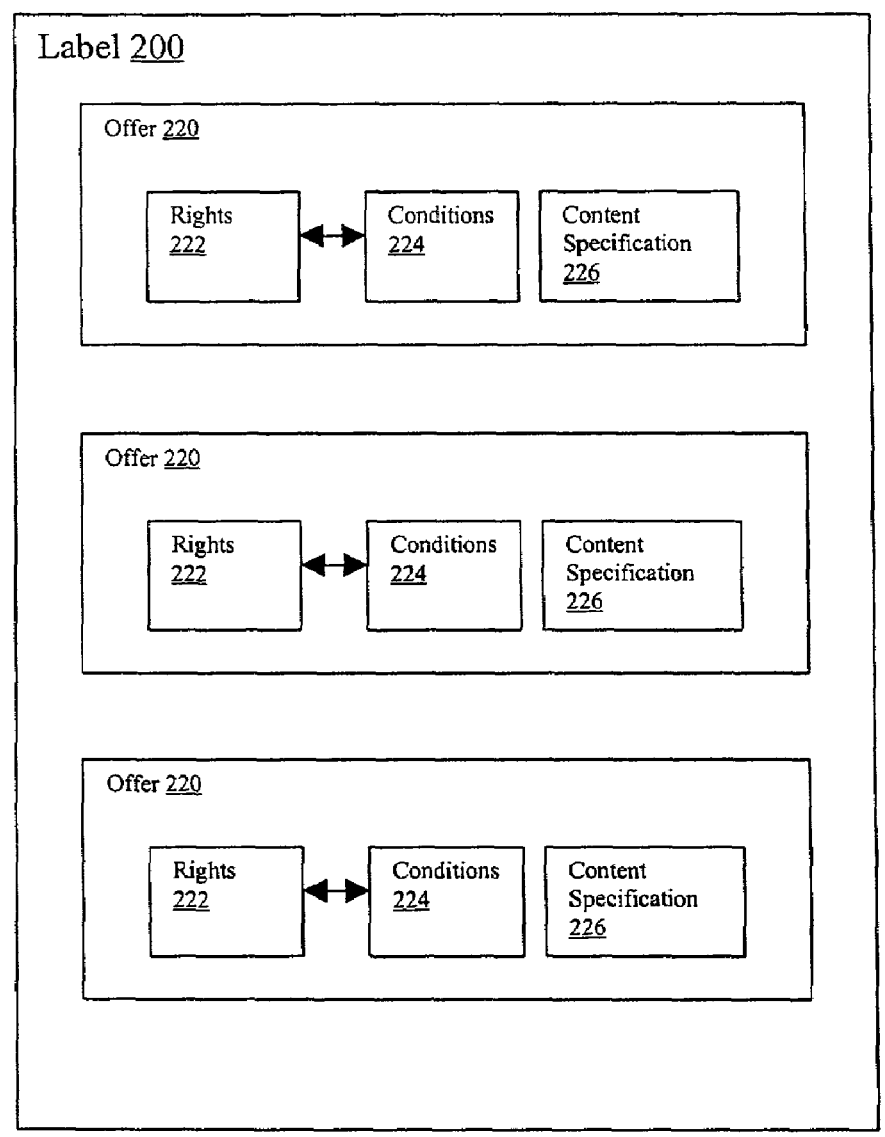
FIG. 2 is schematic illustration of a rights label in accordance with the preferred embodiment.

FIG. 2 schematically illustrates rights label 200 in accordance with the preferred embodiment. Rights labels, or "labels" are collections of rights offers 220. For example, label 100 can include one or more offers 220, and a user has the option to select any of the offers 220 to use the content in accordance with the usage rights 222 of the selected 220 offer after satisfying the conditions 224 of the selected offer 220. Labels 200 can be constructed by selecting one or more offers and bundling them together in a package.

As noted above, rights and conditions, as distinct entities, are an abstract concept with little practical use. For example, distributors and the like do not generally need to create rights and conditions independently of offers. In the model of the preferred embodiment, the basic elements that are going to be used and reused are rights offers 220 and rights labels 200. Rights offers 220 are very useful because they form the basis for offering something, i.e. content for use. As noted above, an offer 220 can consist of a "bundle" of rights 222 and the condition 224 or conditions for that bundle. So the bundling of rights 222 can be accomplished when an offer 220 is created. For example, as a single offer 220, a publisher may wish to provide both view and print together as usage rights 222. Conditions 224 can also be specified when offer 220 is created. Thus offer 220 precisely defines right 222 or a rights bundle and the associated condition 224 or conditions. Offers 220 have practical use independent of labels as will became apparent form the description below.

The preferred embodiment permits manipulation of offers 220 in an object oriented manner. For example a distributor or author may create many offers 220 and keep them organized in a folder, i.e. directory, represented as a graphical object. The offers 220, as objects, may be named with descriptive practical names such as "Confidential Doc for Mgrs.ofr". Note that offer objects are denoted with the file extension ".ofr" in the preferred embodiment. However, any file extensions or nomenclature can be used to name offer objects. Offer objects, the corresponding graphical icon, and offers 220 themselves represent the same entity and thus will be collectively referred to as "offers 220."

In order to be used to regulate the use of content, offers 220 should be associated with content. Rights labels 200, or "labels" specify the association of offers 220 to content. Labels 200 specify the digital content, through a link or the like known as content specification 226, and can also include metadata of the content. For example, metadata in a label can include the title of the content, the author, or any other relevant information. Further, labels 200 can specify, i. e., be associated with, portions of the content (as in a composite document) and can include metadata associated with each portion. Thus, a single label 200 can include metadata for the entirety of content and metadata for portions of the content.

Content can be associated with one or more offers of a label. Further, labels can support "precedence rules" to facilitate specification. For example, if every portion of content has the same offer, the offer can be associated with the first portion of content. As objects, labels can be deleted, renamed, or organized in a folder as will become apparent from the disclosure below.

An editor, in the form of computer software to be run on a general purpose computer (such as a personal computer running the Microsoft Windows 2000™, operating system) can be provided to create and edit offers and labels and to manage the same. The editor can also be used to create label templates, or "templates." A label template contains one or more offers, but has no document association. Otherwise, a label template is similar to a label. Templates can be used, an reused, as is or edited prior to being associated with content to facilitate the creation of labels. For example, common combinations of offers can be used as a template to reduce the need to create a new label each time the combination of offers is needed.

Figure 3:
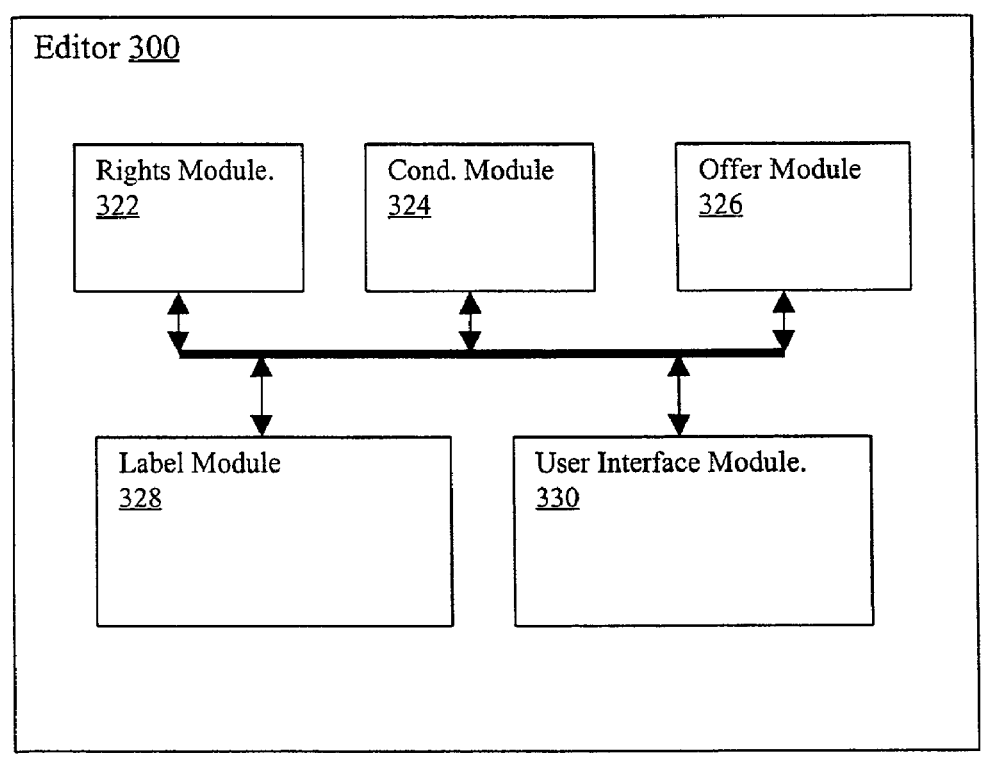
FIG. 3 is a block diagram of the editor of the preferred embodiment.

FIG. 3 illustrates label editor 300 of the preferred embodiment capable of creating and manipulating offers, creating and manipulating label templates, and creating and manipulating labels. Further, editor 300 provides object oriented managing functions as described below. Editor 300 includes rights module 322 for specifying usage rights 222, conditions module 324 for specifying conditions 224, offer module 326 for combining usage rights 222 and conditions 324 into offers 220, and label module 328 for combining one or more offers 220 and associating the same with content to define labels 200. User interface module 330 provides a graphical user interface for each of the other modules as described in detail below.

User interface module 330 presents the editor, i.e., a person creating, editing, or managing offers and labels, with a screen display window where all existing labels are listed as described below. Menu items will allow the user to create a new label or to edit/copy/delete and otherwise manage a selected label or offer or a selected group of labels and or offers. Labels and offers can be represented as graphical objects, i.e. icons, and the user can either select an existing icon and select an "edit" command or select the "new" command to create a new label or offer.

Figure 4:
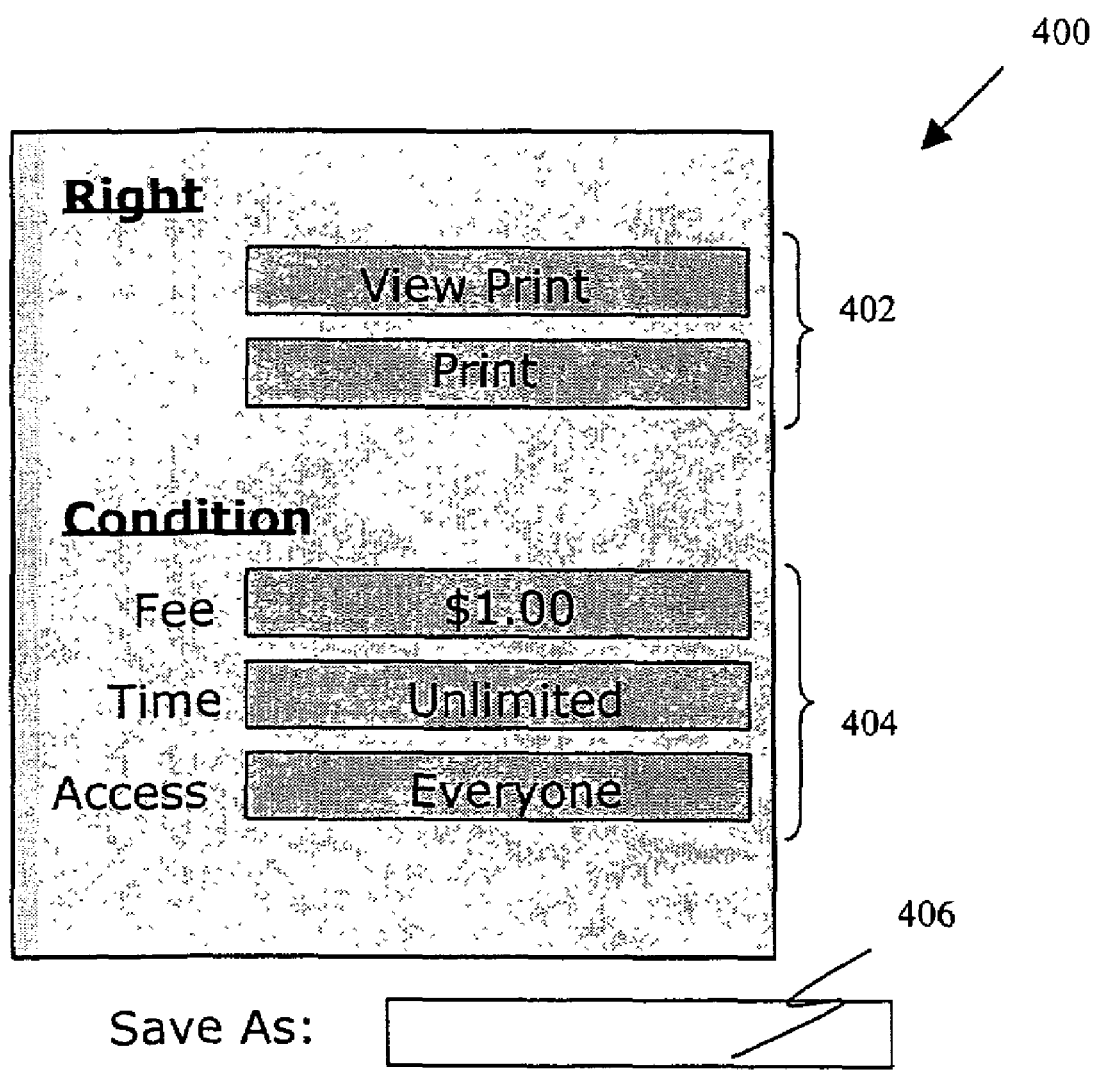
FIG. 4 is an example of an offer creation and editing screen of the preferred embodiment.

Assuming a new offer is to be created and the user has selected the "new" command, the user is presented with the "new offer" screen illustrated in FIG. 4. In this screen, the user will be able to enter the name of the offer in field 406. For example a descriptive name such as "view and print for one dollar" can be used. As will become apparent below, the functionality of rights module 322, conditions module 324, and offers module 326 are presented through user interface module 330 to permit creation and editing of offers 220.

Pull down menus 402 each include a list of various predetermined rights to permit the user to select from the lists one or two usage rights or combinations of usage rights. Of course, there can be more than two pull down menus 402 to permit a more flexible selection of usage rights. Usage rights in the list can include "PRINT," "COPY," "VIEW," "DISTRIBUTE," or any other manner of use. Also, each list can include combinations of rights, such as "PRINT and VIEW." Similarly, pull down menus 404 each include lists of various predetermined conditions to permit the user to select from the lists conditions or combinations of conditions. It can be seen that the conditions lists are divided into a "FEE" list, a "TIME" list, and an "ACCESS" list. Of course, these lists can be combined or segregated further to include other lists. Fees can include various monetary amounts, times can include various time periods (such as one month after purchase), and access can include various persons, groups, or everyone. It can be seen that the combination of selections from pull down menus 404 can be used to flexibly define conditions, such as "upon payment of $1.00, anyone can use the content in accordance with the usage rights for an unlimited time period" as in for example FIG. 4. An icon corresponding to an existing offer can be "opened" by double clicking with a mouse for example, to present screen 400 and permit rights and conditions to be edited by making selections from pull down menus 402 and 404.

Figure 5:
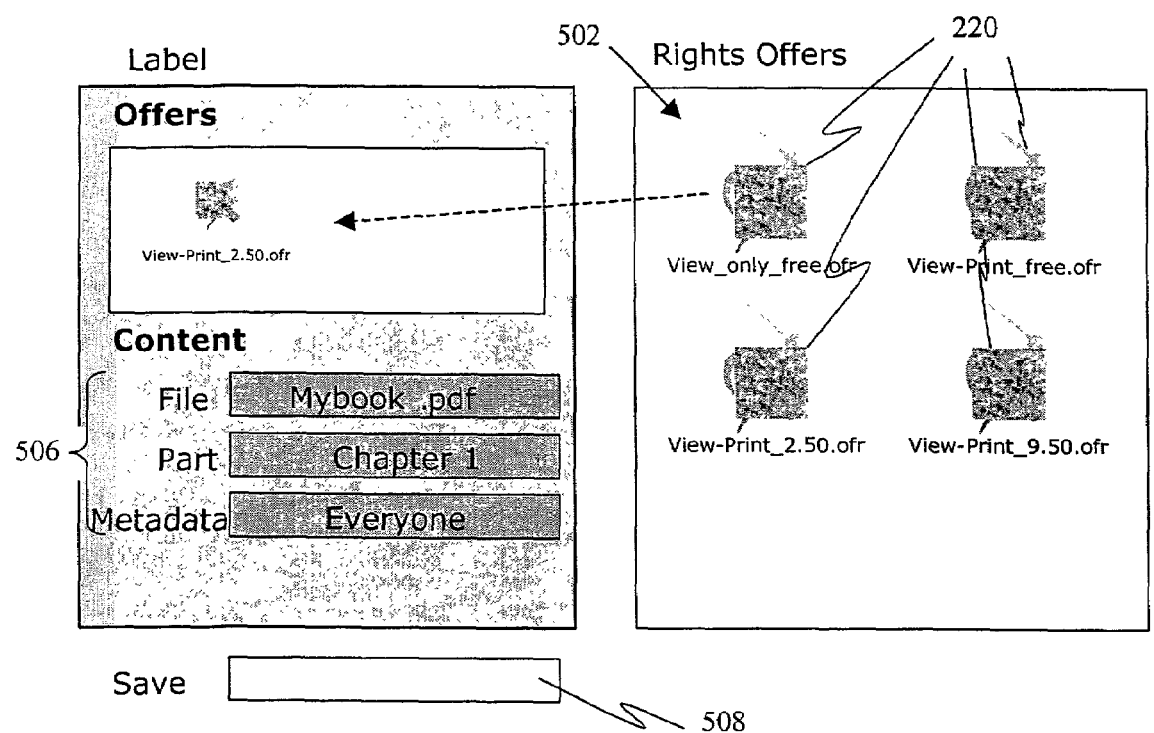
FIG. 5 is an example of a label creation and editing screen of the preferred embodiment.

Once offers 220 are created, they can be managed like any other kind of objects and manipulated to create labels 200 through label module 328 and user interface 330. FIG. 5 illustrates a display screen for selecting offers 220, in a graphical manner, bundling the offers, and associating the bundle with content to create labels 200. In the example of FIG. 5, there are four offers 220, each represented by an icon in list window 502 and having a descriptive name. Of course, there can any number of offers 220 and they can be displayed in any manner, such as in the form of a list, a directory tree, or the like. User interface module 330 is operative to permit the user browse through offers 220 and "open" offers 220 examine the conditions and rights thereof, through a display similar to that in FIG. 4, for example. Creation of label 200 can be accomplished by "dragging" one or more desired offers 220 into offers window 504 representing a "rights label container." Drop down menus 506 can be used to specify the filename of content to be associated with the offers, the portion of the content corresponding to the offers, and metadata relating to the content. Note that the drop down menu 506 corresponding to metadata is merely a generic representation for the sake of simplicity. However drop down menus or data entry fields for "author," "title," "publication date," or any other specific metadata can be provided. Editing of Labels 200 can be accomplished in a similar manner by selecting icons representing labels 200 to open a window similar to that of FIG. 5. Opening one of offer icons 220 will display a screen similar to that of FIG. 4 for editing offers 220. Label 200 can be can saved as and object by entering a descriptive name in field 508 and selecting a "save" command.

User interface module 330 can present the user with sections through pull down menus or lists, browse boxes, fields, buttons, or any other interface for selecting or specifying the various values. Labels 200 can be saved, copied, moved and the like, as an object, similar to any type of file or object. The model of the preferred embodiment provides a level of abstraction that shields, the editor from computer code. However, labels 200 actually are comprised of some type of underlying computer readable file having code, data, grammar, or the like, all referred to as "code" herein. For example, the underlying code can be in the XrML™ grammar or in the grammar disclosed in U.S. Pat. No. 5,715,403. In some cases, it may be desirable to have access to this computer readable code of labels 200 to manipulate labels 200 in various ways.

Figure 6:
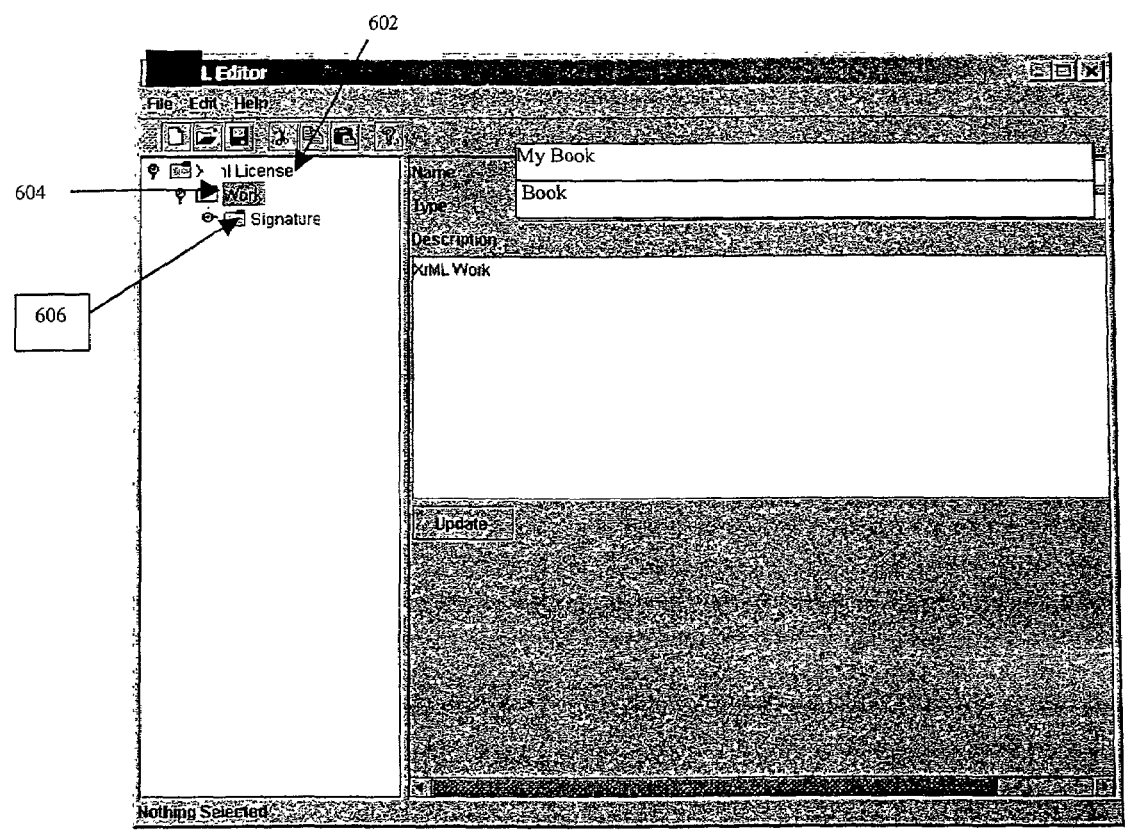
FIG. 6 is an example of a license editing screen of the preferred embodiment.

FIG. 6 shows a screen presented by user interface module 330 for facilitating editing the code of label 200. In window 602, the hierarchical structure of thef file named "license" and corresponding to a label 200 is presented at 602. For the license file can include a work 604, i.e., content, that has been encrypted, and corresponding signatures or keys 606 for each work. A description of the selected work is presented in window 604. Editor 300 can load files, such as XrML files and check their syntax and semantics. Also, editor 300 can be used to manipulate the underlying files to label 200 to permit more flexible creation of labels. For different industries (such as the music industry or book publishing industry), different templates can be created to customize to the needs of that industry. For example, units used for book publishers may be chapters, pages, or volumes, while units used for the music industry can be tracks or minutes. For each industry, one general purpose template that covers the conventional parameters can be used as the default template. By using the hierarchical, i.e., free, structure of FIG. 6, one node can be copied to another node, making the changes in the relevant fields much easier and faster. For the management of the labels 200 (for example, finding expired labels 200), labels 200 can be selected in order by issue date or expiration date as described below.

Upon opening file user interface module 330 displays a code editor screen. FIG. 7 shows an example of a screen of a code editor presented by user-interface module 330, which has two settings: "Simple Edit" and "Advanced Edit." When "Simple Edit" is selected a simple menu interface 700, is displayed for managing labels 200, as shown in FIG. 7. The simple interface includes display fields for the label name, the URL of the label, rights, fees, and metadata.

FIG. 8 is an example of a screen displayed when advanced edit is selected. It can be seen that the code, XrML code in the preferred embodiment, is displayed in an edit window for direct editing with a conventional text editor interface or the like. This permits a "hands on" approach to label editing that is very flexible and leverages the full power of the code used for creating labels 200. Only a potion of the code is illustrated in FIG. 8. It can be seen however, that the code includes metadata, a key, and other information in the XrML format.

FIG. 9 illustrates another screen displayed by user interface module 330 for management of labels 200. Labels 200 are displayed as a list of label names. The list can be sorted based on the date or any other parameter in the corresponding label 200. Label searches can be conducted by title and/or date of last modification. Some or all labels can be selected, highlighted, edited, or deleted. For multiple selections, the same settings are applied to all selected labels to accomplish batch processing on labels. For example, in batch processing, all prices of similar books can be set at $10.00, simultaneously. Editing can be accomplished through screens similar to those described above. Labels 200 can be organized in folders, as noted above. When an offer 220 or rights template is applied to a folder, all labels 200 inside the folder will be associated with that offer or template.

The interface and model of the preferred embodiment offers multiple advantages over conventional systems. For example, the process of preparing labels can be automated by assigning an offer or template to a label container, adding content and metadata to the container in the manner described above. The container can be in the form of a folder or window and the objects can be dragged into the folder or window.

Further, content preparation functions can be integrated into existing applications (for example, into a DocuShare™ application where the content is "prepared" on its way to the repository). Another example is "preparation-on-the-fly" for "just-in-time" publishing applications. Since labels, offers, and templates are in the form of objects, they can be easily integrated with existing applications. Information in the label, particularly the metadata can be indexed for additional functionality. The index can be searchable. Search results point back to the label and to the document it associates with. The general index can be the basis of a portal for content. This permits very flexible searching and distribution of content within a DRM system. Also, rights can be delegated. For example, a publisher can give a distributor limited distribution for content merely by assigning the publishers label is to the distributor, but with limitations.

While a preferred embodiment of the invention has been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations. Accordingly, the true scope of the invention is defined by the appended claims and legal equivalents.

What is claimed is:

1. A system for manipulating and managing usage rights adapted to be associated with digital content, said system comprising:
   a rights module operative to specify one or more rights indicating a manner of use of the digital content;
   a conditions module operative to specify one or more conditions necessary for exercising the manner of use of the digital content; and
   an offers module operative to combine the one or more rights specified by said rights module and the one or more conditions specified by said conditions module to create a rights offer object including the usage rights and the conditions necessary for exercising the manner of use of the digital content indicated by the usage rights.

2. A system as recited in claim 1, further comprising a label component for configuring one or more rights offers into a label object adapted to be associated with specified content, whereby a user can select one or more of the rights offers in the label to exercise a manner of use with respect to the content.

3. A system as recited in claim 2, wherein the offer object and the label object are graphical objects.

4. A system as recited in claim 3, further comprising a batch support module operative to apply operations to plural selected objects in a collective manner.

5. A system as recited in claim 4, wherein said batch support module includes a drag and drop interface.

6. A system as recited in claim 2, wherein said label object represents a file of computer code.

7. A system as recited in claim 6, wherein the code is in XrML format.

8. A system as recited in claim 2, wherein said label specifies the content and metadata associated with the content.

9. A system as recited in claim 2, wherein said label serves as a label template.

10. A system as recited in claim 2, wherein said labels specifies parts of the content and the metadata associated with the parts of the content.

11. A system as recited in claim 9, wherein said label includes precedence rules.

12. A system as recited in claim 2, further comprising means as editing module operative to view and edit said label.

13. A system as recited in claim 9, wherein said label template contains plural offers.

14. A system as recited in claim 9, wherein said label template includes generic metadata.

15. A system as recited in claim 14, wherein said generic metadata includes the name of the content.

16. An electronic label for expressing usage rights adapted to be associated with digital content, said label comprising:
   usage rights specifying a manner of use of the digital content;
   conditions specifying one or more conditions necessary for exercising the manner of use of the digital content,
   wherein one or more of said usage rights and one or more of said conditions are combined to create a rights offer object; and
   a label container including the rights offer object.

17. A label as recited in claim 16, wherein said label further comprises a file of computer code expressing said usage rights and said conditions.

18. A label as recited in claim 16, further comprising an association to content.

19. A label as recited in claim 17, wherein the code is in XrML format.

20. A label as recited in claim 18, further comprising metadata associated with the content.

21. A label as recited in claim 16, further comprising precedence rules.

* * * * *